United States Patent [19]

Ressmeyer et al.

[11] Patent Number: 5,787,570
[45] Date of Patent: *Aug. 4, 1998

[54] LOAD DISTRIBUTION MEASUREMENT AND ADJUSTMENT DEVICE

[75] Inventors: James J. Ressmeyer, Apple Valley; Lloyd C. Goss, Bloomington, both of Minn.

[73] Assignee: Martronics, Inc., Burnsville, Minn.

[*] Notice: The term of this patent shall not extend beyond the expiration date of Pat. No. 5,371,939.

[21] Appl. No.: 597,831

[22] Filed: Feb. 7, 1996

Related U.S. Application Data

[63] Continuation-in-part of Ser. No. 293,718, Aug. 22, 1994, abandoned, which is a continuation-in-part of Ser. No. 88,868, Jul. 8, 1993, Pat. No. 5,371,939.

[51] Int. Cl.$^6$ .................... G11B 3/70; G11B 5/105
[52] U.S. Cl. ........................... 29/603.09; 360/75
[58] Field of Search ................... 29/603.07, 603.09, 29/607.12; 72/8.1, 14.1, 161.1, 842.1, 21.4, 31.01; 360/104; 140/92.1

[56] References Cited

U.S. PATENT DOCUMENTS

| | | |
|---|---|---|
| 3,510,374 | 5/1970 | Walker . |
| 4,487,649 | 12/1984 | Gyi et al. . |
| 4,603,567 | 8/1986 | Smith et al. ................. 72/8 |
| 4,761,699 | 8/1988 | Ainslie et al. . |
| 4,809,427 | 3/1989 | Suzuki et al. . |
| 4,866,836 | 9/1989 | Von Brandt et al. . |
| 4,964,941 | 10/1990 | Von Brandt et al. ............ 29/603.09 X |
| 5,142,770 | 9/1992 | Cain et al. . |
| 5,225,950 | 7/1993 | Crane . |
| 5,297,413 | 3/1994 | Schones et al. ................. 29/603.09 X |
| 5,311,763 | 5/1994 | Gibbs, Jr. et al. ............... 73/9 |
| 5,471,734 | 12/1995 | Hatch et al. ..................... 29/603.09 X |

*Primary Examiner*—Aristotelis M. Psitos
*Assistant Examiner*—K. Wong
*Attorney, Agent, or Firm*—Patterson & Keough, P.A.

[57] ABSTRACT

A head gimbal measurer for measuring the force loading on a head, the head having a plurality of air bearing surfaces, to predict the fly height of a selected one of the plurality of air bearing surfaces when the head is in operation relative to a rotating magnetically coated disc, including a measurement device for measuring the total normal force on the head and the differential normal force on each air bearing surface. A comparing device for comparing the measured total normal force on the head and the differential normal force on each air bearing surface with a known total normal force on the head and a known differential normal force on each air bearing surface to predict a fly height of the head when in operation relative to the rotating magnetically coated disc. The invention is further a load distribution measurement and adjustment device designed to shape a load arm of a head gimbal assembly used to transfer data to and from a rotating magnetically coated disc.

19 Claims, 8 Drawing Sheets

LOAD DISTRIBUTION MEASUREMENT AND ADJUSTMENT DEVICE

This application is a continuation-in-part application of Ser. No. 08/293,718, filed Aug. 22, 1994, which is a continuation-in-part application of Ser. No. 08/088,868, filed Jul. 8, 1993, now U.S. Pat. No. 5,371,939, issued Dec. 13, 1995.

TECHNICAL FIELD

The present invention relates to the head gimbal assembly utilized to read and write data on a magnetic coated disc. More particularly, it relates to a device for accurately measuring load distribution of the head of the head gimbal assembly to predict fly height of the head with respect to the rotating disc and shaping the load arm of the head gimbal assembly in order to establish the desired fly height of the head over the disc.

BACKGROUND OF THE INVENTION

The method of retrieving data from a magnetic coated hard disc and putting new data on the disc has certain parallels to the way a record player functions. Like the record played on a record player, the disc rotates at relatively high speed about a central axis. An arm, like the tone arm of the record player, is positioned above the spinning disc to retrieve data off the disc. Unlike the record player, this arm can also put new data on the disc as well as retrieve it.

The arm is called a head gimbal assembly (HGA) and consists of three components: the load arm, the gimbal and the read/write head. Additionally, connecting leads are attached to the read/write head and are routed along the top of the load arm. These leads are retained in place typically by small clips formed in the upper side of the load arm. The load arm is a suspension device usually constructed of metal and is approximately one and one half inches long. The load arm both supports the read/write head and applies a downward force on the read/write head. The gimbal is a moveable attaching device that attaches the read/write head to the load arm. The gimbal permits the read/write head to move in both pitch and in roll as the read/write head flies above the disc.

When viewed end on, an embodiment of the read/write head has two spaced apart lands separated by a groove. When the head is positioned on the load arm, the two lands are oriented tangential to a circle having its origin at the center of the disc. The inner land is located radially nearer to the center of the disc than the outer land. The active portion of the read/write head that actually does the data retrieval and the imposition of new data on the disc is formed integral to the outer land on the surface of the land that is closest to the disc. This surface is called an air bearing surface (ABS). Other embodiments include orienting the air bearing surface radially with respect to the disc or having three lands on the read/write head oriented in a generally triangular configuration with the center, trailing land including the active portion of the read/write head.

When the disc is not in operation, the read/write head is resting on the disc in response to the force imposed by the load arm. When the disc begins to rotate, the read/write head is lifted off the surface of the disc by a stream of air known as an air bearing. The force of the air bearing counters the force of the load arm and the read/write head actually flies over the surface of the disc and is subject to many of the same aerodynamic forces that an aircraft is when in flight. For accurate data retrieval and imposition, it is very important that the read/write head flies very accurately over the disc. Precisely locating the read/write head with respect to the disc when the read/write head is in flight is a major factor in ensuring the accurate data transfer of the read/write head.

At present, flying heights between the air bearing surfaces of the read/write head and the magnetic disc surface are approaching two to three micro inch spacing. Manufacturing tolerances in the head gimbal assembly and lack of optimum positioning of the read/write head cause unwanted errors in flying height of finished HGA's. This greatly diminishes the production yield rate of finished HGA's.

As previously indicated, the active read/write magnetic transducer is frequently located on the outer air bearing surface of the read/write head. This is desirable in order to use the largest disc surface available for read/write recording and to optimize the amount of recorded data on the disc. It is also desirable to have the active transducer, and thus its supporting ABS, fly at a height equal to or lower than the inactive inner ABS. Offsetting the gimbal toward the outer ABS prior to bonding the read/write head to the gimbal will cause the outer ABS to fly lower and the inner ABS to fly higher. This must be very accurately done to achieve the desired result. A second approach to achieve the same result is to first bond the read/write head to the load arm and then to shape the load arm to achieve the desired fly height.

Another present source of error in the production of HGA's is the fact that the underside surface of the load arm to which the gimbal is attached may not be exactly coplanar with the HGA mounting surface (commonly termed the base). The base is designed to be coplanar with the disc. Therefore, the HGA is not coplanar with the disc. Manufacturing tolerances on coplanarity between the load arm and the mounting surface of the base are currently three tenths of a degree to one degree. While such angular difference is relatively small, this tolerance causes additional variation of differential flying height between the two air bearing surfaces. An approach to correct for the angular difference is to first bond the read/write head to the load arm and then to shape, by bending, the load arm to achieve the desired coplanarity. This is done using angular references only without regard to the loading that is imposed on the HGA and has not been fully satisfactory.

Present industry convention defines positive direction differential flying height or roll as the outer ABS flying lower than the inner ABS. To ensure the proper flight height and roll, each ABS must be instrumented to measure the vertical load and the load on each ABS. The measuring devices must be able to accurately measure very small loads on the order of one to five grams, to an accuracy and resolution of one to ten milligrams.

The current devices used for measuring the force on the two air bearing surfaces of the read/write head read only the total gram loading, as distinct from the present invention which reads both the total gram loading and the differential gram loading on each ABS. The current devices and are therefor prone to error. This error results in ultimately mispositioning the read/write head on the gimbal and thereby causing poor flight characteristics of the read/write head.

The read/write head is a very small device and, in keeping with the trends in the electronics industry, successive generations of read/write heads keep getting smaller. This trend intensifies the need to more accurately position the head on the load arm. Accordingly, it would be a decided advantage in the disc file industry to have a load distribution measurement and adjustment device that would accurately measure differential loads on the two air bearing surfaces of the read/write head and accurately shape by bending the load arm to achieve a desired differential loading of the ABS's in order to ensure the desired fly height of the read/write head when the read/write head is in operation with a rotating disc.

SUMMARY OF THE INVENTION

The apparatus of this invention provides accurate measurement of the differential forces on two air bearing surfaces to predict fly height and provides an automatic shaping of the load arm to obtain the desired differential forces on the read/write head. The present invention employs a unique system of force balance, closed loop, servo controlled, positioning and measuring mechanisms in conjunction with a biaxial shaping apparatus to achieve the desired load arm configuration to achieve the desired fly height with the particular read/write head and gimbal that are bonded to the load arm, forming the HGA. The solution is unique to a given load arm, gimbal and read/write set of the particular HGA.

In principle, a force balance system measures the force required to return a surface to its original position when a change in force is applied to the surface. A linear variable differential transformer (LVDT) type electromechanical positioning transducer or equivalent device is employed to measure displacement from a reference position. This application of LVDT requires very small transducers to detect movement in the micro-inch range. These LVDT are therefore low inductance devices requiring a high-frequency drive signal. A phase sensitive LVDT demodulator circuit is used. This circuit produces a phase reversal to generate a bipolar signal around the zero set point.

A linear voice coil type electromechanical force actuator is employed to return the surface to the original position when the load on the surface changes. The force versus current gain coefficient of a correctly designed voice coil actuator is extremely accurate over a wide force range, especially when the voice coil in the magnetic field is always returned to its original position when the load changes. The linearity of the voice coil is expressed in the relationship of $F=K\beta li$. In this relationship, $F$=resulting force, $K$=numerical constant for system of units, $\beta$=air gap flux density, $l$=active wire length, and $i$=coil current.

Both the position transducer and the voice coil actuator are non contact devices and thus have zero friction and hysteresis forces to cause measurement and position errors. The permanent magnets of the voice coil actuator are preferably constructed of samarium cobalt. Samarium cobalt is a rare earth material that is highly coercive, generates high energy and also has a very low temperature coefficient. These characteristics permit the fabrication of an accurate, stable, and repeatable measuring system.

A third element in this invention is the closed loop servo control system which returns the measuring surface to its original position when the applied load changes. A closed loop servo control system permits controlled output motion of the reference surfaces during measurement and positioning of the read/write head. A closed loop servo control system also permits returning to neutral positions not in contact with the read/write head before and after measurement of the differential gram forces on the read/write head. This permits rapid sequential processing of a large number of number of head gimbal assemblies. The closed loop servo control further allows use of a damped dither signal to reduce frictional force at the load arm support mounting to near zero.

The present invention is a head gimbal measurer for measuring the force loading on a head, the head having a plurality of air bearing surfaces, to predict the fly height of a selected one of the plurality of air bearing surfaces when the head is in operation relative to a rotating magnetically coated disc. The head gimbal measurer comprises a measurement device for measuring the total normal force on the head and the differential normal force on each air bearing surface. A comparing device compares the measured total normal force on the head and the differential normal force on each air bearing surface with a known total normal force on the head and a known differential normal force on each air bearing surface to predict a fly height of the head when in operation relative to the rotating magnetically coated disc.

The invention is further a load distribution measurement and adjustment device designed to shape a load arm of a head gimbal assembly used to transfer data to and from a rotating magnetically coated disc. The load arm has a gimbal mounted thereon and the gimbal supports a head. The head has at least two spaced apart air bearing surfaces. The shaping of the load arm is adapted to achieve the desired total gram loading and differential gram loading on the head needed to cause a selected one of the at least two air bearing surfaces of the head to fly at a desired fly height above the rotating magnetically coated disc and the head to fly at a desired flight attitude with respect to the rotating magnetically coated disc. The load distribution measurement and adjustment device comprises a gram load measurement device that is operably coupled to a selected two of the at least two air bearing surfaces of the head for measuring the total gram loading on the head and the differential gram loading on each of the selected two air bearing surfaces of the head. A processor is communicatively coupled to the gram load measurement means for comparing the measured total and differential gram loading measurements made by the gram load measurement means to known total and differential gram loadings of the head, the known total and differential gram loadings of the head being related to a desired fly height of a selected air bearing surface of the head above the rotating magnetically coated disc. An angular actuator is operably coupled to the processor for applying a twisting force and bending force to the load arm responsive to commands generated by the processor. Such commands are related to the comparison of the measured total and differential gram loading measurements made by the gram load measurement means to the known total and differential gram loadings of the head.

DETAILED DESCRIPTION OF THE DRAWINGS

Figure 1:
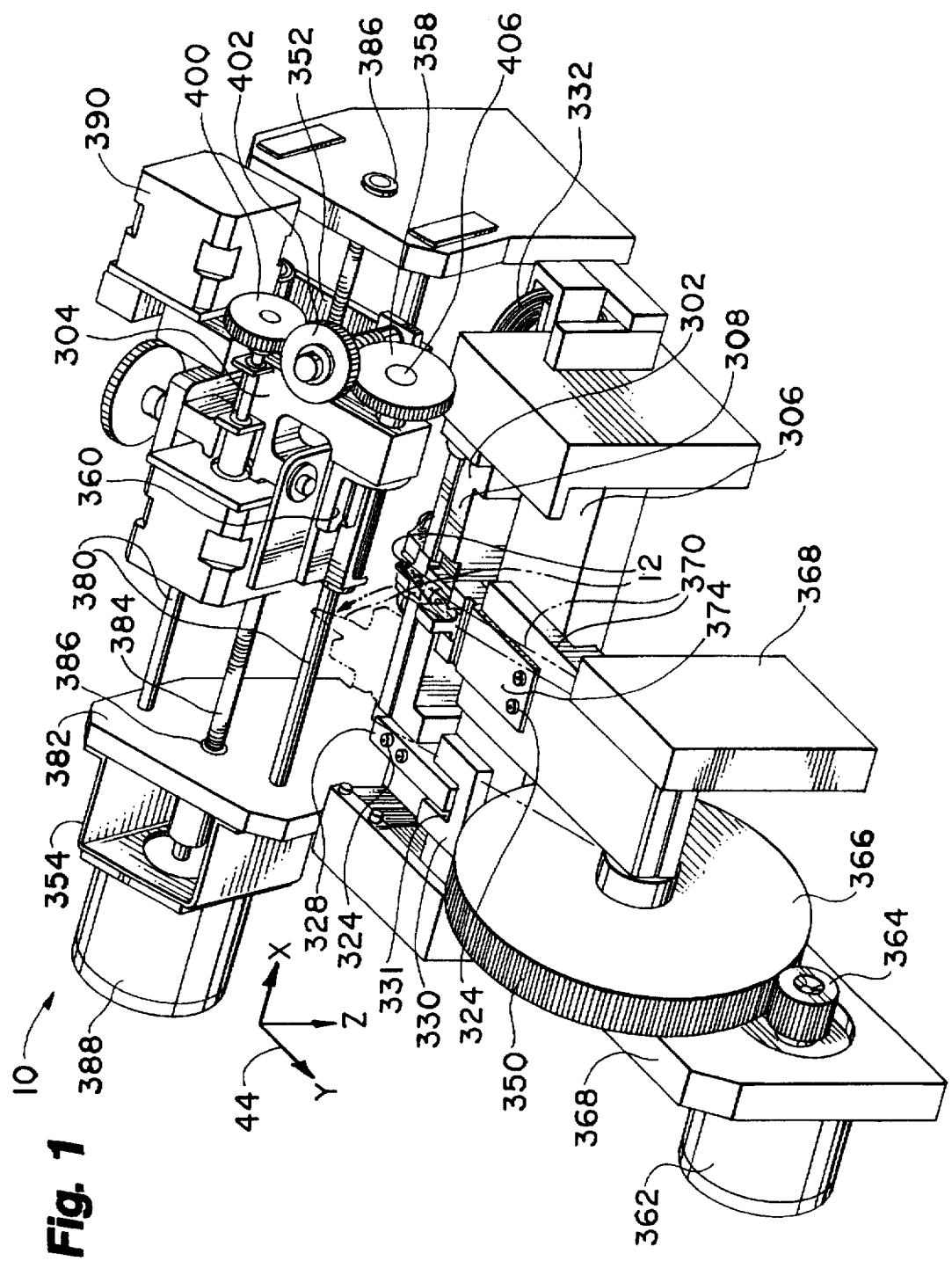
FIG. 1 is a perspective view of the load distribution measurement and adjustment (LDA) device made according to the present invention.
Figure 1A:
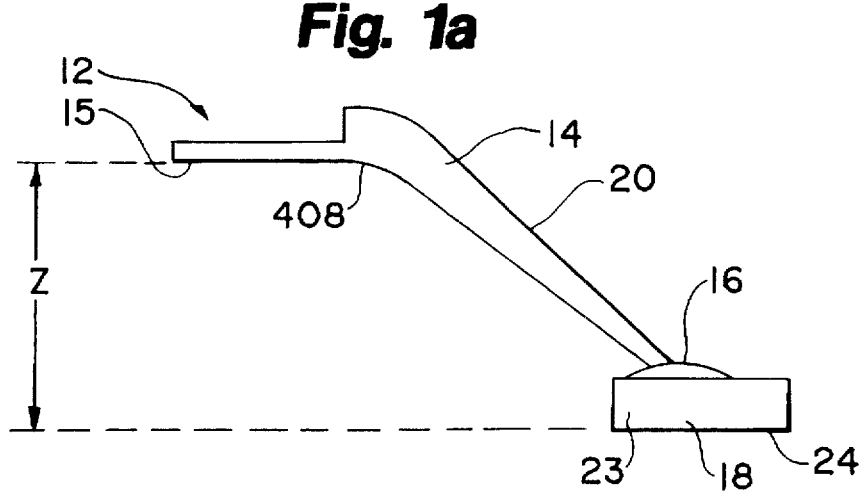
FIG. 1a is a side elevational view of a head gimbal assembly.
Figure 2:
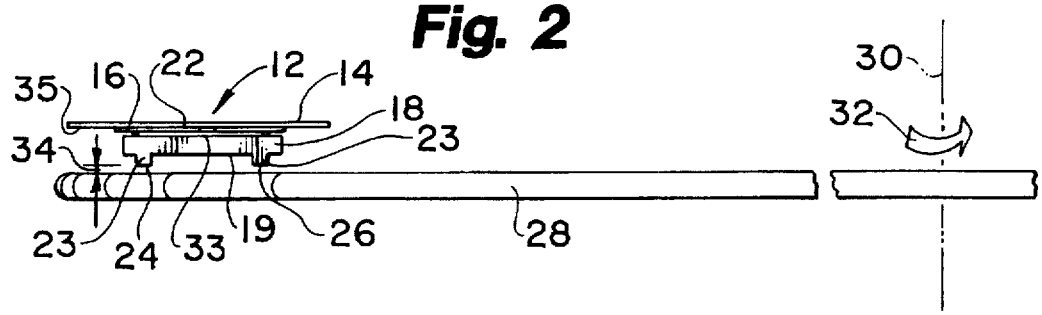
FIG. 2 is a front elevational view of a head gimbal assembly in flight above a magnetic disc.

The load distribution measurement and adjustment device (LDA) of the present invention is shown generally at 10 in FIG. 1. The LDA 10 is utilized in the construction of a head gimbal assembly (HGA) 12. The head gimbal assembly 12 is depicted in FIG. 1a, with closeup views of the tip portion thereof depicted in FIGS. 2 and 3. As depicted in FIG. 2, the HGA 12 is comprised of load arm 14, gimbal 16, and head 18. Load arm 14 is a relatively long metallic arm designed to support gimbal 16 and head 18 as well as to apply a selected down force on head 18. Accordingly, load arm 14 is relatively stiff, but acts as a spring having a certain amount of up and down play. In a preferred embodiment, load arm 14 has upturned edges 20 that provide a stiffening effect to load arm 14.

Gimbal 16 and head 18 are exceedingly small devices located on the underside of tip 22 of load arm 14 as depicted in FIG. 1a. FIG. 2 depicts tip 22 of load arm 14. Gimbal 16 is shown bonded between the underside of load arm 14 and the upper side of head 18. It is understood that gimbal 16 may be formed integral to the underside of load arm 14 as by the etching of load arm 14. Gimbal 16 is a flexible device designed to permit head 18 to move in both the pitch and roll axes with respect to load arm 14 responsive to external forces.

Head 18 is a read/write head utilized for applying data to a hard disc and retrieving data from a hard disc. Head 18 has a relatively broad central groove 19 flanked by two downward projecting lands 23, each such land 23 having an air bearing surface 24, 26. The active transducer that actually does the read/write function is not shown, but is located in the underside of air bearing surface 24. Typically, the transducer is located at the rear of air bearing surface 24. Air bearing surface 24 is designed to be positioned closest to the outer edge of the hard disc 28 when head gimbal assembly 12 is positioned within a disc drive or the like. This permits utilizing the maximum area of disc 28 for read/write functions. The active transducer is typically an inductive pickup coil.

Head gimbal assembly 12 is shown in FIG. 2 positioned above disc 28. This represents the operating condition with the disc 28 in rotational motion. The size of head gimbal assembly 12 with respect to disc 28 is exaggerated in order to show more clearly the positioning of head gimbal assembly 12. The central axis of rotation of disc 28 is shown at 30 and the direction of rotation is shown by arrow 32. In operation, head gimbal assembly 12 rests on the surface of disc 28 while disc 28 is not rotating. Head 18 is held in contact with the surface of disc 28 by a downward force generated by load arm 14. At the time disc 28 is brought into rotational motion, an air bearing (not shown) is energized. The air bearing provides a flow of air that causes head 18 to literally fly above the rotating disc 28. The air flow of the air bearing counters the downward force imposed on head 18 by load arm 14. Flight height of head 18 above disc 28 as shown by arrows 34. In current applications, the flight height is approximately five microinches.

Flight height 34 is a critical parameter in determining the performance of head gimbal assembly 12. It is desirable to have the active transducer in air bearing surface 24 fly at a slightly lower height than air bearing surface 26 with respect to disc 28. It is possible to achieve this difference in flight height by suitable bending of load arm 14 or by off setting the gimbal 16 toward air bearing surface 24. Additionally, to ensure the desired flight height 34, the upper surface 33 of head 18 and the lower surface 35 of load arm 14 must be coplanar. Current manufacturing tolerances allow for a plus and minus one degree error in the two surfaces 33, 35 from being exactly coplanar. This error causes an additional variation in the differential flying height between air bearing surface 24 and air bearing surface 26.

Figure 3:
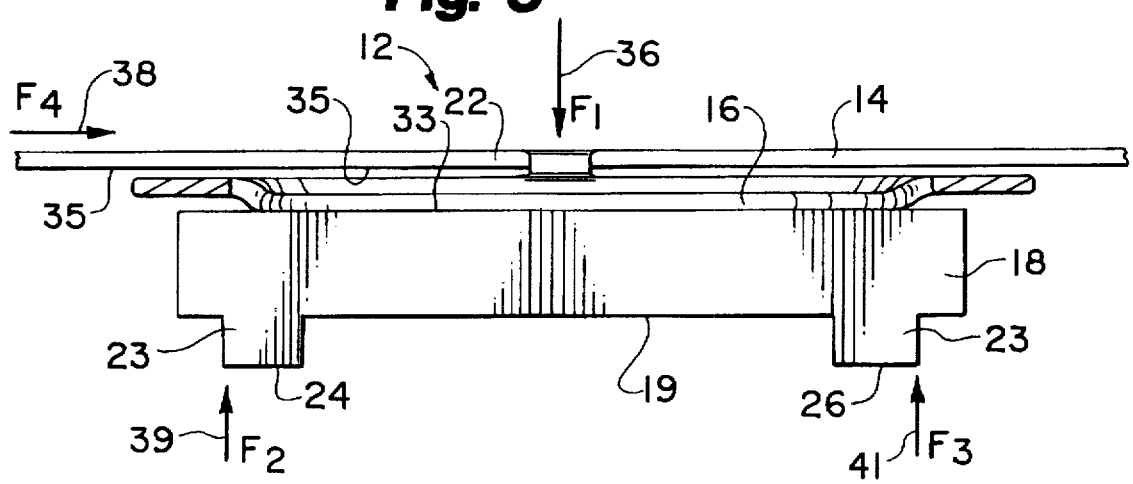
FIG. 3 is an enlarged front elevational view of the load arm, gimbal, and the head and the forces affecting the load arm, gimbal, and the head.

Bending of load arm 14 in two axes to achieve the desired flight height 34 is accomplished with LDA 10 utilizing differential force balance techniques as inputs thereto. Referring to FIG. 3, two external forces affect flight height 34. The first force, labeled F1 and shown by arrow 36 is the downward force imposed by load arm 14 on head 18. As previously indicated, this force, in a preferred embodiment, is approximately five grams. The second force is an overturning moment force labeled F4 and shown at 38. F4 is depicted as acting from left to right in FIG. 3. It is understood, however, that F4 can alternatively act from right to left. Overturning force F4 is a force that may be induced by a slight bend in load arm 14, by friction that exists between gimbal 16 and load arm 14 when gimbal 16 is adhesively bonded to load arm 14, or by friction that occurs at the point of mounting load arm 14. Overturning moment force 38 tends to rotate head 18. As depicted in FIG. 3, this rotational force acting upon head 18 would tend to increase the downward force on air bearing surface 26 while decreasing the downward force on air bearing surface 24.

Upwardly directed force F2, labelled 39, acting upon air bearing surface 24, and upwardly directed force F3, labelled 41, acting upon air bearing surface 26, counter forces F1 and F4. By accurately determining the sum of forces F2 and F3 and the differential between force F2 and F3, the desired flight height 34 of head 18 can be achieved. LDA 10 orients load arm 14 to achieve the desired differential force between force F2 and F3 and total force, the sum of F2 and F3. The LDA 10 is designed to accurately bend load arm 14 in two axes after head 18 is bonded to load arm 14. This accurate bending permits achieving the desired total force and force differential between forces F2 and F3.

A fully assembled HGA 12 is depicted in FIG. 1a. The load arm 14 is bent downward from base 15 to the point of attachment of gimbal 16. The head 18 is bonded to gimbal 16. The distance between the underside of base 15 and the air bearing surface 24 of head 18 while head 18 is flying over the disc 28 is defined as the Z height of the HGA 12. In the depiction of FIG. 1a, the bend in load arm 14 and the resulting Z height are depicted in exaggerated form. The Z height may be, for example, twenty-three thousandths of an inch in a working example of an HGA 12.

The X, Y and Z directions as used herein are indicated by the reference diagram 44 depicted in FIG. 1. The LDA 10 has two major subcomponents: measurement group 302 performs the gram loading measurements on head 18 of HGA 12 as previously described. The actuation group 304 generally bends and twists load arm 14 of HGA 12 responsive to the measured gram loading in order to configure HGA 12 with the desired total gram loading and differential gram loading for use in performing the designed read/write functions of HGA 12.

Figure 4:
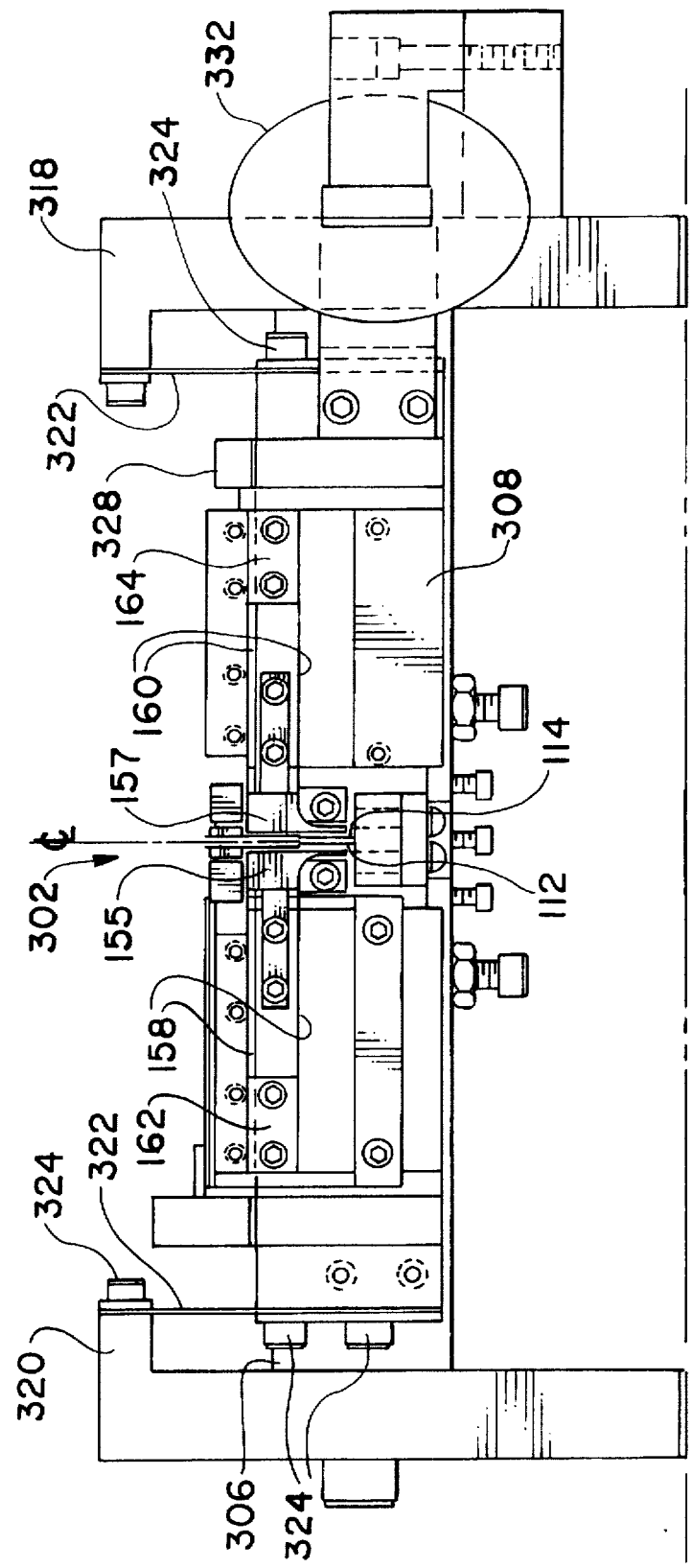
FIG. 4. is a front elevational view of the load distribution and measurement group of the present invention.
Figure 5:
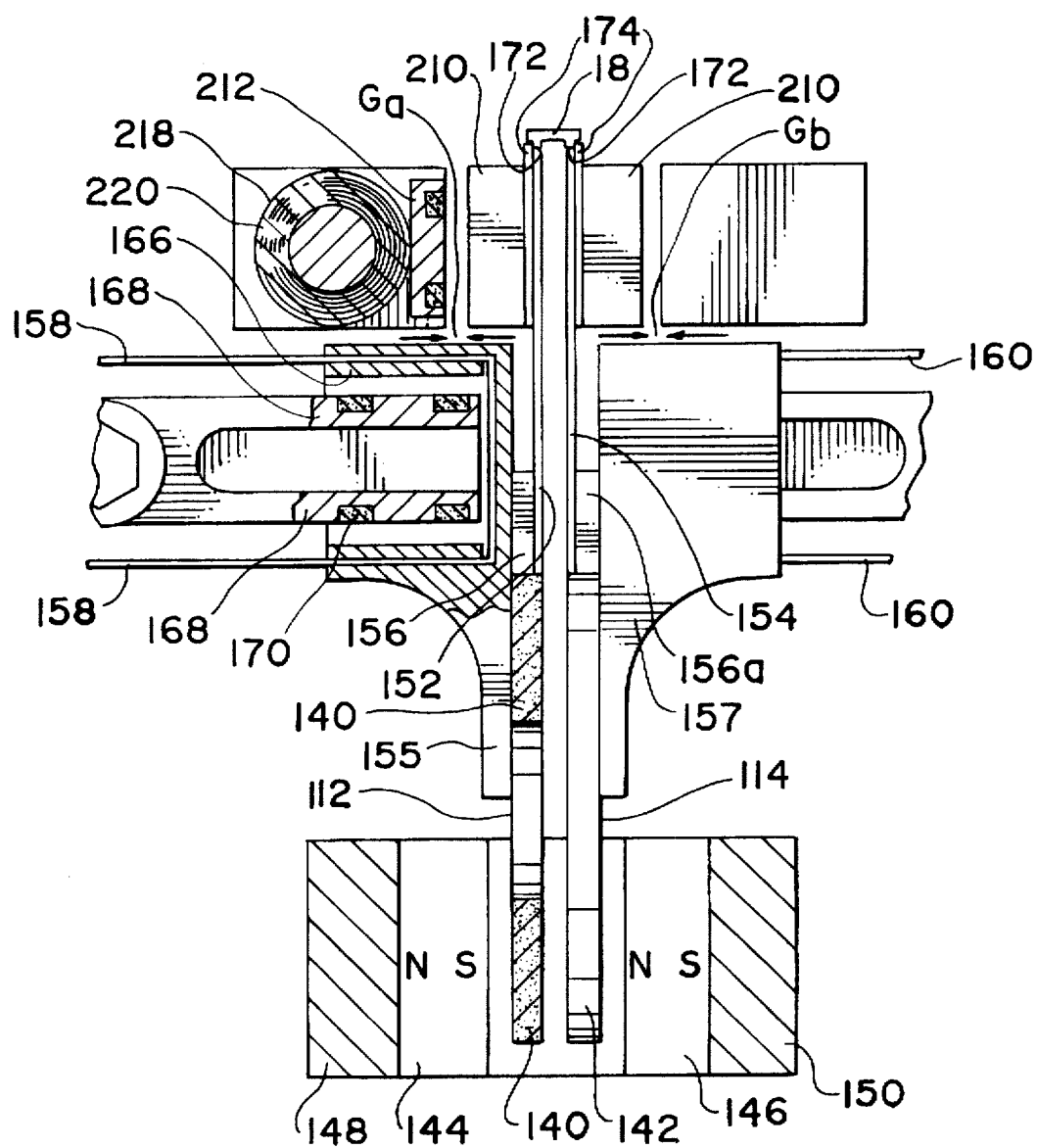
FIG. 5 is a front elevational view of the base unit with portions broken away showing the vertical coils, the vertical position sensors, the overturning moment sensor, and the spreader coils.
Figure 6:
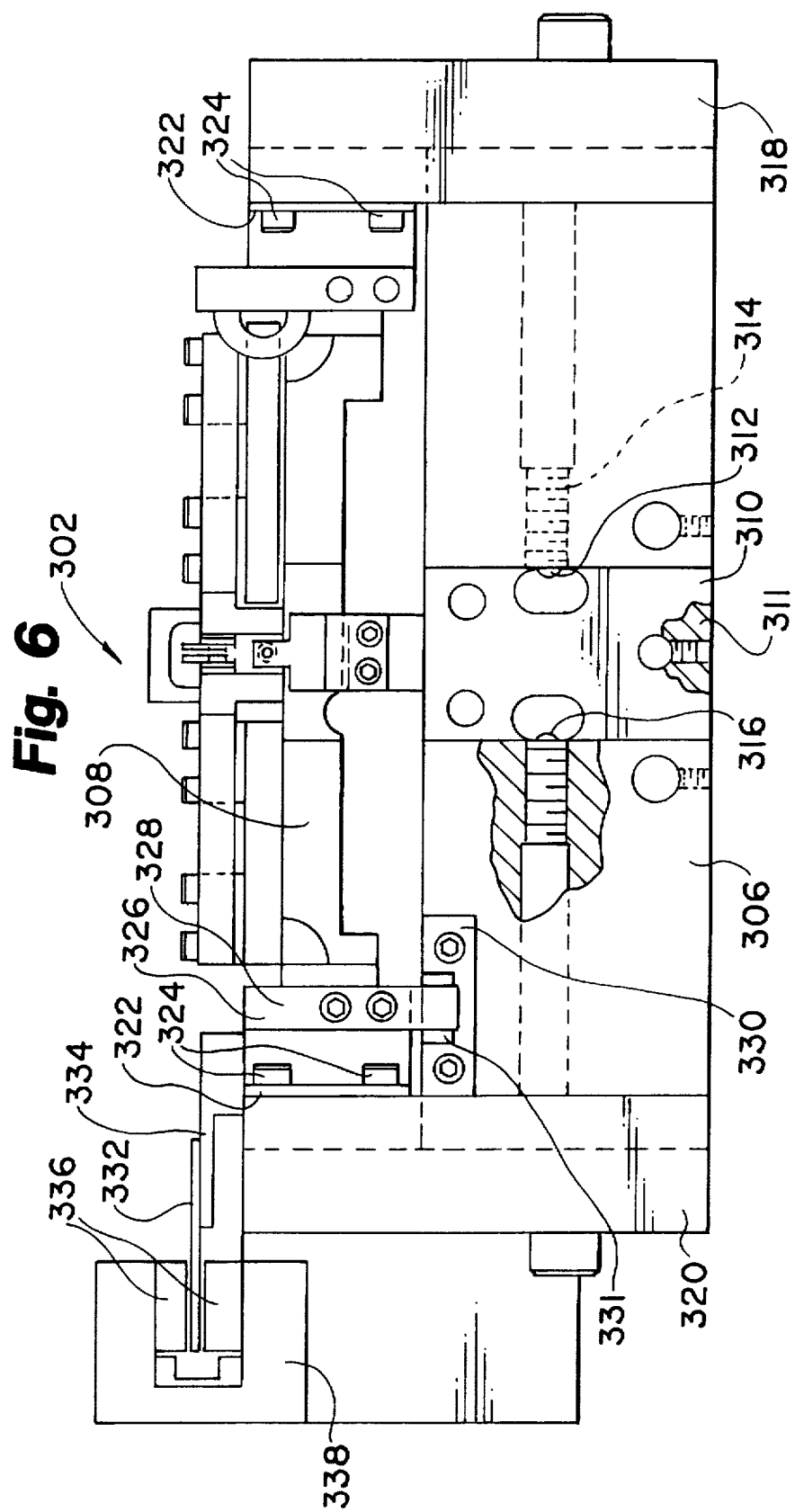
FIG. 6 is a top elevational view of the measurement group of the load distribution measurement and adjustment device (LDA)

Referring to FIGS. 1, 4 and 5, measurement group 302 of LDA 10 is comprised of four main components: stationary base 306, left vertical servo assembly 112, right vertical servo assembly 114, and translating base 308. It is understood that the total and differential gram loading measurements that are the subject of the present invention can be made by a number of measuring means coupled to apparatus for bearing the gram load on each of the air bearing surfaces 24, 26 of the head 18. Such measuring means could be, for example, load cells, as well as the presently described measuring devices comprising the measurement group 302 of the embodiment detailed herein.

The stationary base 306 provides a support for additional components to be described subsequently and is preferably formed of a milled metallic material.

The milling is highly accurate in order to accurately position the supported components. Z reference plate 310 is slideably mounted in a groove 311 defined in the upper surface of stationary base 306. Z reference plate 310 is preferably formed of a hardened steel and is precision formed to have a desired height dimension that is related to the specific Z height of the specific HGA 12. Z reference plate 310 is slidingly engaged with groove 311. Z reference plate 310 is held in place in groove 311 by spring loaded steel balls 312. The balls 312 are urged towards Z reference plate 310 by springs 314. The balls 312 engage detents 316 formed in the side of Z reference plate 310. A plurality of Z reference plates 310 having varying depth dimensions are available for utilization in conjunction with LDA 10 to accommodate a variety of HGA 12 devices having differing Z heights.

End posts 318, 320 are affixed at the side edges of stationary base 306. End posts 318, 320 form supports for translating base 308. Downward depending flexures 322 are affixed by cap screws 324 proximate the upper edge of end posts 318, 320. Flexures 322 are affixed to translating base 308 by cap screws 324. Flexures 322 are preferably slender metallic strips made of beryllium copper. Flexures 322 are capable of slight bending that permits translating base 308 to translate a defined distance left and right as depicted in FIGS. 13, 14.

A motion sensor 326 is utilized to detect the amount of such translation. Motion sensor 326 is comprised of a translating portion 328 and a stationary portion 330. Translating portion 328 is affixed by cap screws 324 to translating base 308. Stationary portion 330 is affixed by cap screws 324 to stationary base 306. Translating portion 328 translates within a gap 331 defined in stationary portion 330. The dimensions of gap 331 essentially define the limits of translation of translating base 308.

The translation of translating base 308 is effected by translation coil 332. Translation coil 332 is affixed to translating base 308 by arm 334. A portion of translation coil 332 resides in a gap formed between permanent magnets 336. Permanent magnets 336 are firmly affixed to stationary base 306 by mount 338. Inducing a current in translation coil 332 causes translation of translating base 308.

Left vertical servo assembly 112 and right vertical servo assembly 114 are mirror images of one another, spaced apart and facing each other across the centerline, $C_L$, of stationery base 306. The details of portions of left vertical servo assembly 112 and right vertical servo assembly 114 are best viewed in FIGS. 4 and 5. Vertical servo assemblies 112, 114 include coils 140, 142. Each coil 140, 142 has its associated permanent magnet 144, 146, respectively. Permanent magnets 144, 146 are spaced apart from the lower portion of coils 140, 142, respectively, defining an air gap therebetween. The south pole of permanent magnet 144 faces coil 140 and the north pole of permanent magnet 146 faces coil 142. Permanent magnets 144, 146 are bonded to magnetic pole pieces 148, 150 respectively.

Flexure caps 155, 157 have structure forming a joint between several components. This joint is best viewed in FIG. 10. Flexure caps 155, 157 extend from adjacent the upper portion of coils 140, 142 upward to embrace the inward facing end of parallelogram flexures 158, 160. The upper portion of coils 140, 142 are bonded to the lower ends of the flexure caps 155, 157 respectively. The lower end of flexures 152, 154 are bonded to spacers 156 and spacers 156 are bonded to the inward facing side of flexure caps 155, 157 respectively. Parallelogram flexures 158, 160 are embraced by and bonded to the outward facing portions of flexure caps 155, 157 respectively. Parallelogram flexures 158 and 160 function to detect the position of coils 140, 142, respectively. The flexure caps 155, 157 act to form solid joints at the lower inward facing corners of parallelogram flexures 158, 160 that bond the parallelogram flexures 158, 160 to spacers 156, vertical flexures 152, 154, coils 140, 142, respectively. Accordingly, motion of coil 140 in the vertical direction is transmitted via flexure cap 155 to displace vertical flexure 152 and spacer 156 and thence to be sensed by parallelogram flexure 158. Similarly, motion of coil 142 in the vertical direction is transmitted via flexure cap 157 to displace vertical flexure 154 and spacer 156a and thence to be sensed by parallelogram flexure 160.

The displacing motion described above acts to change the shape of parallelogram flexure from its normal rectangular shape to a four sided figure having the vertical ends parallel and the longer top and bottom distorted to form a somewhat S-shaped curve. The joint described above, additionally provides the support for the upward projecting vertical flexures 152, 154 and for the downwardly depending coils 140, 142. Coils 140, 142 then, are suspended from flexure caps 155, 157 to a position adjacent permanent magnets 144, 146, respectively and not in contact therewith.

Referring to FIG. 4, parallelogram flexures 158, 160 are formed of slender ribbons of metallic material, preferably beryllium copper, in a generally rectangular form. Parallelogram flexures 158, 160 are anchored by anchors 162, 164 to front face 126 of translating base 308. Anchors 162, 164 are located at the outward directed end of parallelogram flexures 158, 160 opposite from the portion of parallelogram flexures 158, 160 that are bonded to vertical flexures 152, 154. Accordingly, the outward most end of parallelogram flexures 158, 160 are held rigidly and the inward end is free to translate with the motion of vertical flexures 152, 154.

A ferrite chip 166 is bonded to the upper end portion of the metallic strip forming parallelogram flexures 158, 160. Ferrite chips 166 are bonded approximate the inward end of parallelogram flexures 158, 160. Adjacent each ferrite chip 166 is a ferrite cup core 168 within integral winding 170. The cup cores 168 are spaced slightly apart from the ferrite chips 166. Distortion of the parallelogram flexures 158, 160 from the rectangular shape changes the spacing between cup cores 168 and ferrite chip 166 by an amount that is detectable.

The two vertical flexures 152, 154 extend upward in a parallel, spaced apart relationship. The vertical flexures 152, 154 are spaced apart a distance that is slightly less than the width of the head 18. Vertical flexure 152 extends upward to engage the underside of air bearing surface 24 and vertical flexure 154 extends upward to engage the underside of air bearing surface 26. The upper tip 172 of vertical flexures 152, 154 is beveled at a 15° angle. The beveling of upper tips 172 is at a 15° angle slanted inward at the lower edge thereof, toward the center line, $C_L$. A head constrainer 174 is bonded to the outer surface of vertical flexures 152, 154. Head constrainer 174 extends upward beyond upper tip 172 such that when upper tip 172 engages the underside of the air bearing surfaces 24, 26 head constrainers 174 will engage the side of head 18.

The overturning moment detector 120 is best depicted in FIG. 5. To provide detection of the overturning moments, ferrite chips 210 are bonded to the outward facing surface of spacers 156. Ferrite chips 210 are free to translate in the X direction when vertical flexures 152, 154 are displaced in the X direction as a function of an overturning moment. A ferrite cup core 212 is mounted to the front face of translating base 308 in a position facing each of the ferrite chips 210. The ferrite cup core 212 are spaced slightly apart from ferrite chips 210 leaving an air cap therebetween. The ferrite cup core 212 is comprised of a permanent magnet cup 214 with integral coil 216.

Spreader solenoid 218 is integrated into overturning moment detector 120. Spreader solenoid 218 is comprised of a coil 220 acting in conjunction with ferrite chip 210. Coil 220 is oriented at ninety degrees to coil 216 that functions are part of the overturning detector 120. Each overturning moment detector 120 has a spreader solenoid 218 integrated therein to act to spread the vertical flexures 152, 154. Energizing solenoid coil 220 exerts an attracting force on ferrite chip 210 and thereby on vertical flexures 152, 154.

The actuation group 304 includes six major subcomponents: HGA positioner 350, carriage 352, carriage positioner 354, twist actuator 356, bend actuator 358 and HGA angular actuator 360. HGA positioner 350 includes an electric motor 362. A drive gear 364 is directly coupled to the rotatable output shaft of motor 362. Drive gear 364 is in rotational engagement with driven gear 366. Alternatively, a belt drive could be substituted for drive gear 364 and driven gear 366. Driven gear 366 is rotationally borne on a central shaft that extends between stanchions 368.

An HGA positioner arm 370 is mounted on the central shaft that bears driven gear 366 and is fixedly coupled to driven gear 366. Accordingly, rotation of driven gear 366 also causes equiangular rotation of HGA positioner arm 370. An HGA clamp 372 is flexibly mounted to HGA positioner arm 370 by spring 374. Leaf spring 374 carries HGA clamp 372 at a first end and is fixedly coupled to positioner arm 370 at a second end by cap screws 324. HGA clamp 372 is designed to support the HGA 12 during measurement and manipulation operations. A spring loaded retainer (not shown) is designed to be inserted through a bore in HGA 12. The spring bias retains HGA 12 in position on HGA clamp 372.

HGA positioner arm 370 is positionable between a raised actuation position indicated in phantom in FIG. 1 and a lowered measurement position as depicted by solid lines in FIG. 1. In the measurement position, the underside of HGA clamp 372 bears on Z reference plate 310. The positioner arm 370 is somewhat over driven such that spring 374 is in a slightly flexed state, exerting downward pressure on HGA clamp 372 to ensure proper engagement with Z reference plate 310. Such position ensures that HGA 12 is properly positioned to obtain the desired Z height with respect to translating base 308 that is necessary to obtain the desired gram load measurements of HGA 12. The expedient of utilizing spring 374 solves the problem of accurately achieving the desired Z height without having to very accurately control the positioner arm 370.

Figure 7:
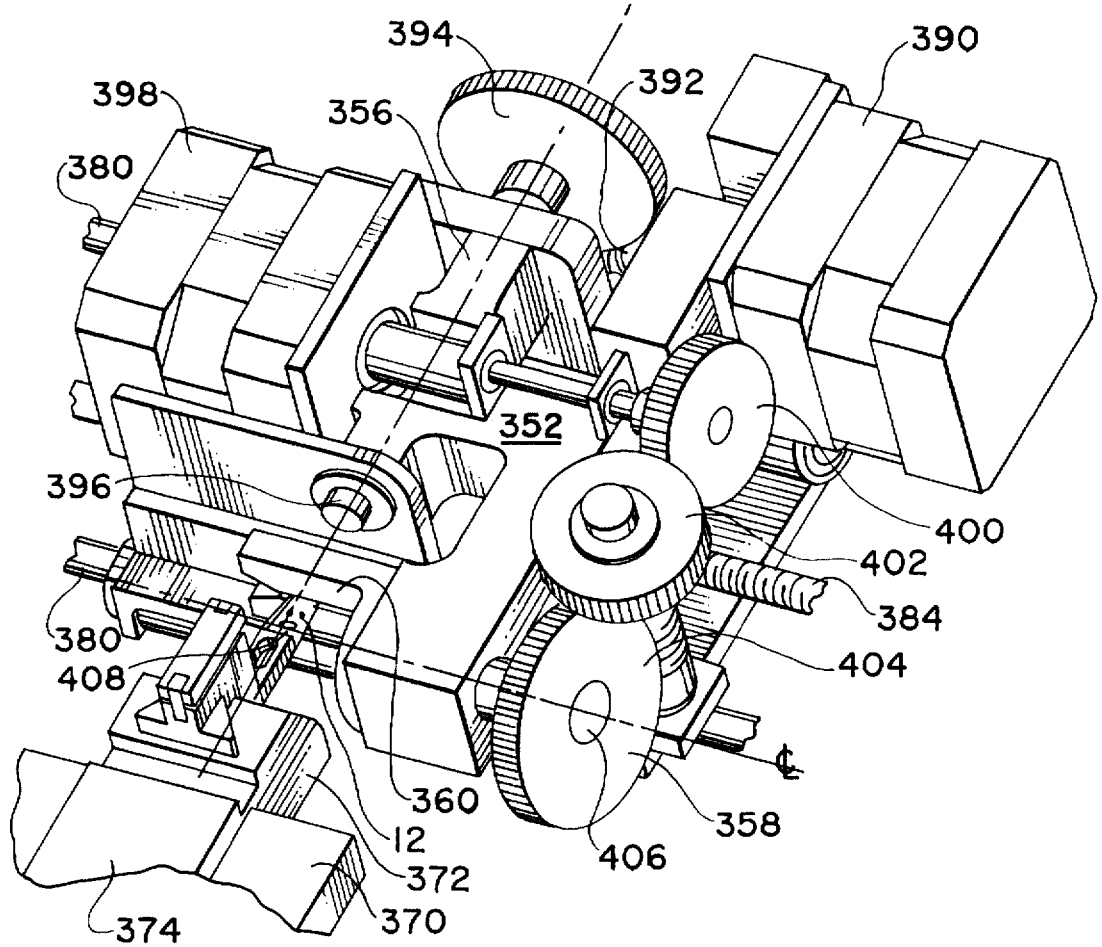
FIG. 7 is a perspective view of the actuation group with the bending actuation of the HGA depicted in phantom.

Referring to FIGS. 1 and 7, carriage 352 is slideably borne on support rods 380 that extend between upright stanchions 382. Support rods 380 are preferably formed of polished steel in order to generate the minimum amount of friction between support rods 380 and carriage 352 during translation of carriage 352. A threaded drive rod 384 is positioned between the support rods 380 and is coplanar therewith. Drive rod 384 is rotatably born within bearings 386 pressed into stanchions 382. Drive rod 384 is coupled to the output shaft of electric motor 388. Energizing motor 388 causes drive rod 384 to rotate resulting in the translation of carriage 352 on support rods 380.

The HGA angular actuator 360 is mounted on carriage 352. HGA angular actuator 360 is comprised of a pair of spaced apart fixed jaws. The gap between the fixed jaws is designed to encompass load arm 14 of HGA 12 without coming into engagement with load arm 14 when in the static condition. This ensures that there is no bending of load arm 14 prior to the bending or twisting actuation thereof. Translation of carriage 352 to the left as indicated in FIG. 12 is designed to bring HGA angular actuator 360 into gripping contact with HGA 12 mounted on HGA positioner arm 370. For such gripping engagement to occur, HGA positioner arm 370 must be in its raised actuation position.

HGA angular actuator 360 is designed to actuate HGA 12 in two different planes. The first such plane is actuation about the longitudinal axis of HGA 12. Such actuation is conventionally termed twist. Twist affects the differing ride height of the air bearings surfaces 24, 26 of head 18. The second axis of actuation is in the longitudinal axis of HGA 12. Such actuation effects the total gram load on head 18 as it is mounted on load arm 14. This actuation is conventionally termed bend.

A twist motor 390 is mounted to carriage 352. The rotating output shaft of twist motor 390 is coupled to a worm gear 392. Worm gear 392 rotates driven gear 394 in either direction as selected. Such actuation rotates a portion of carriage 352, including gripper 360, about twist axis 396. Such rotation results in the previously described twisting motion of HGA angular actuator 360.

Bend motor 398 is affixed to carriage 352. The rotating output shaft of bend motor 398 is rotatably coupled to a gear train containing four gears. Drive gear 400 is fixedly coupled to the output shaft of bend motor 398. Drive gear 400 is rotatably engaged with slave gear 402. The shaft of slave gear 402 includes worm gear 403. Rotation of slave gear 402 also causes rotation of worm gear 403. Worm gear 403 is in turn rotatably coupled to driven gear 404.

Drive gear 404 is mounted on a rotatable shaft 406. Rotatable shaft 406 carries through the adjacent structure of carrier 352 and is fixedly coupled to HGA angular actuator 360. Rotation of rotatable shaft 406 causes the rotation of HGA angular actuator 360 in an arc about a bend axis that extends centrally through the longitudinal axis of rotatable shaft 406. During the formation of HGA 12 the load arm 14 is bent around a mandrel forming a bend radius 408 as depicted in FIG. 1a in order to establish the desired Z height. In an embodiment, the bend axis that extends through the center of rotatable shaft 406 is designed to be aligned with the bend radius 408 of HGA 12. Accordingly, the arcuate bending rotation of HGA angular actuator 360 acts to effect a bend of load arm 14 at the bend radius 408 of HGA 12. In a further embodiment, the bend axis that extends through the center of rotatable shaft 406 is positioned relative to the HGA 12 such that the arcuate bending rotation of HGA angular actuator 360 acts to effect a bend of the load arm 14 at a position displaced from this bend radius 408 of HGA 12.

Referring to FIG. 7, HGA angular actuator 360 is depicted in position to apply bending and twisting actuation to HGA 12. To achieve this positioning, positioner arm 370 is in the raised actuation position depicted in phantom in FIG. 1. Carriage 352 has translated to the left as depicted in FIG. 1 to permit HGA angular actuator 360 to encompass HGA 12 without physically engaging HGA 12. In the position depicted in FIG. 15, the twist axis 396 of twist actuator 356 is aligned with the longitudinal axis of HGA 12 and the bend axis of bend actuator 358 which is concentric with the center of rotatable shaft 406 is aligned with the bend radius 408 of HGA 12. In this manner, twist is applied about the longitudinal axis of HGA 12 and bend is applied in the longitudinal axis of HGA 12 about the bend radius 408 of HGA 12.

Figure 8:
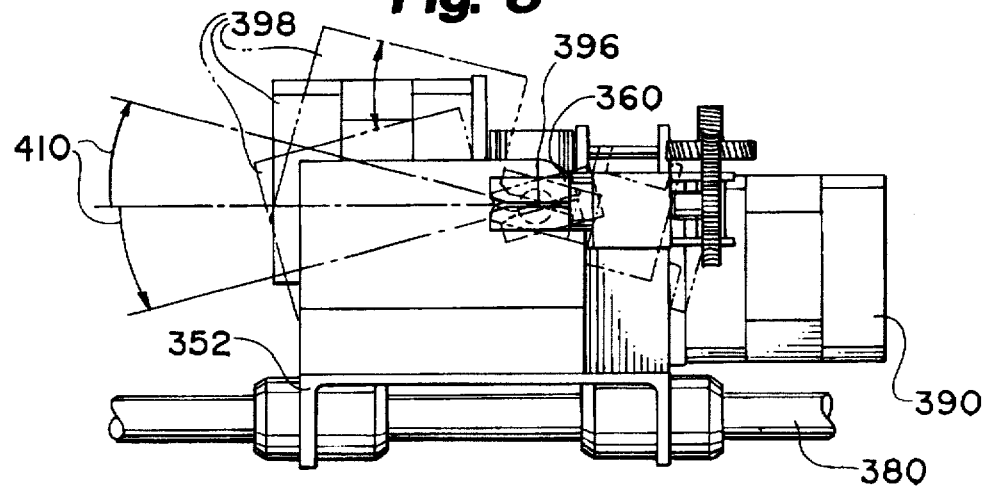
FIG. 8 is a side elevation of the actuation group with the bending actuation of the HGA depicted in phantom.

FIG. 8 depicts carriage 352 slideably mounted on support rods 308. FIG. 8 additionally depicts the twisting actuation of HGA angular actuator 360. The twisting actuation is oriented about twist axis 396. Twist axis 396 is directed into the paper and is at a right angle thereto in the illustration of FIG. 16 at the point of intersection of the twist angles 410.

The twist angles 410 depict clockwise twist and a counter clockwise twist. A clockwise twist 410 will twist HGA 12 to affect the differential gram loading and to cause air bearing surface 24 to fly closer to disk 28 than air bearing surface 26. A counter clockwise twist by HGA angular actuator 360 will have the opposite effect on HGA 12.

Figure 9:
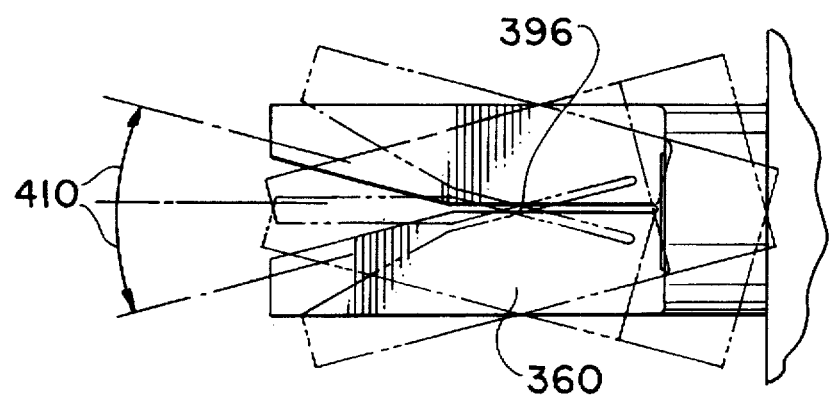
FIG. 9 is an enlarged elevation of the actuation group with the bending actuation of the HGA depicted in phantom.
Figure 10:
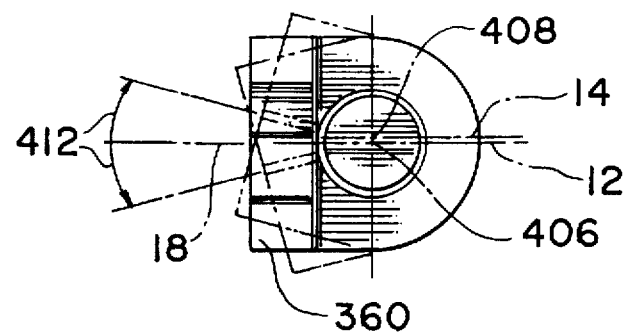
FIG. 10 is an end elevation of the actuation group with the twisting actuation of the HGA depicted in phantom.

FIGS. 9 and 10 depict the twist and bend actuation of which HGA angular actuator 360 is capable. FIG. 9 depicts the twist actuation again showing the twist axis 396 at a right angle to and located at the intersection of twist angles 410.

FIG. 10 depicts the bending actuation of HGA angular actuator 360. HGA 12 is shown in phantom engaged with HGA angular actuator 360. The head 18 mounted to load arm 14 projects to the left of HGA angular actuator 360. The bend radius 408 of HGA 12 is located along the bend axis defined by the center of the rotatable shaft 406 of bend actuator 358. During bending actuation, HGA angular actuator 360 moves in an arc having a radius defined by the distance between HGA 360 and the bend axis at the center of the rotatable shaft 406. This arced bending motion results in the bend that is induced in HGA 12 to be located at the bend radius 408. An upward and a downward bend angle 412 are depicted in FIG. 18. An upward bend 412 will result in a decrease in the total gram loading on HGA 12. A downward bend 412 would results in an increase in the total gram loading on HGA 12.

In operation, the HGA 12 which is to be shaped to achieve desired total gram loading and differential gram loading on head 18 is manually loaded onto HGA clamp 372 when positioner arm 370 is in the raised actuation position as depicted in phantom in FIG. 1. Differing types of HGA 12 have differing desired Z heights. Such Z heights are known and accordingly the Z reference plate 310 having the necessary depth to accommodate the desired Z height of the HGA 12 is selected and positioned in the groove 311 defined in stationary base 306.

To commence the measurement of HGA 12, motor 362 is actuated and positioner arm 370 is lowered to the measurement position. As positioner arm 370 is lowered, the underside of HGA clamp 372 comes in contact with the upper surface of Z reference plate 310. Positioner arm 370 continues to move a short distance after such contact is made, causing flexure of spring 374. In the measurement position, HGA 12 is properly positioned with respect to the translating base 308 for the total gram load and differential gram load measurements to be made.

In order to make the above measurements, the head 18 of HGA 12 must first be acquired by the left and right vertical flexures 152, 154. Acquisition is accomplished by lowering both left and right vertical flexures 152, 154. A current is induced in translation coil 332 and the translating base 308 is moved to the left. In this position, left vertical flexure 152 is raised and translating base 308 is then moved to the right. Left vertical flexure 152 comes in contact with the side of head 18. This contact causes a slight bending of left vertical flexure 152 which is detected by the overturning moment detector 120. The rightward motion of translating base 308 is stopped as soon as the overturning moment detector 120 detects that the left vertical flexure 152 is in contact with head 18. At this point, the right vertical flexure 154 is raised and is brought into contact with head 18. Vertical flexures 152, 154 are raised further, lifting HGA 12 and breaking contact between load arm 14 and HGA clamp 312.

A dithered motion in the X direction is applied by translating base 308 to ensure that vertical flexures 152, 154 have effectively acquired the head 18. It is necessary to ensure that any overturning moments are removed prior to making the total and differential gram loading measurements. To eliminate such moments, the HGA 12 must be moved relative to the vertical flexures 152, 154 in the X direction. To achieve such motion, either the HGA 12 may be moved, as described in the co-pending parent application, or the vertical flexures 152, 154 may be moved. Accordingly, in the present embodiment, a further dithered motion in the X direction is applied by translating base 308 in the event that the overturning moment detector 120 senses the presence of an overturning moment. The dither is utilized to zero out the sensed overturning moment. Feedback from the overturning moment detector 120 is utilized to ensure that the moment has been nulled. In the position of the HGA after removal of the overturning moment, only the total gram load and the differential gram load on head 18 is borne by left and right vertical flexures 152, 154.

Figure 11:
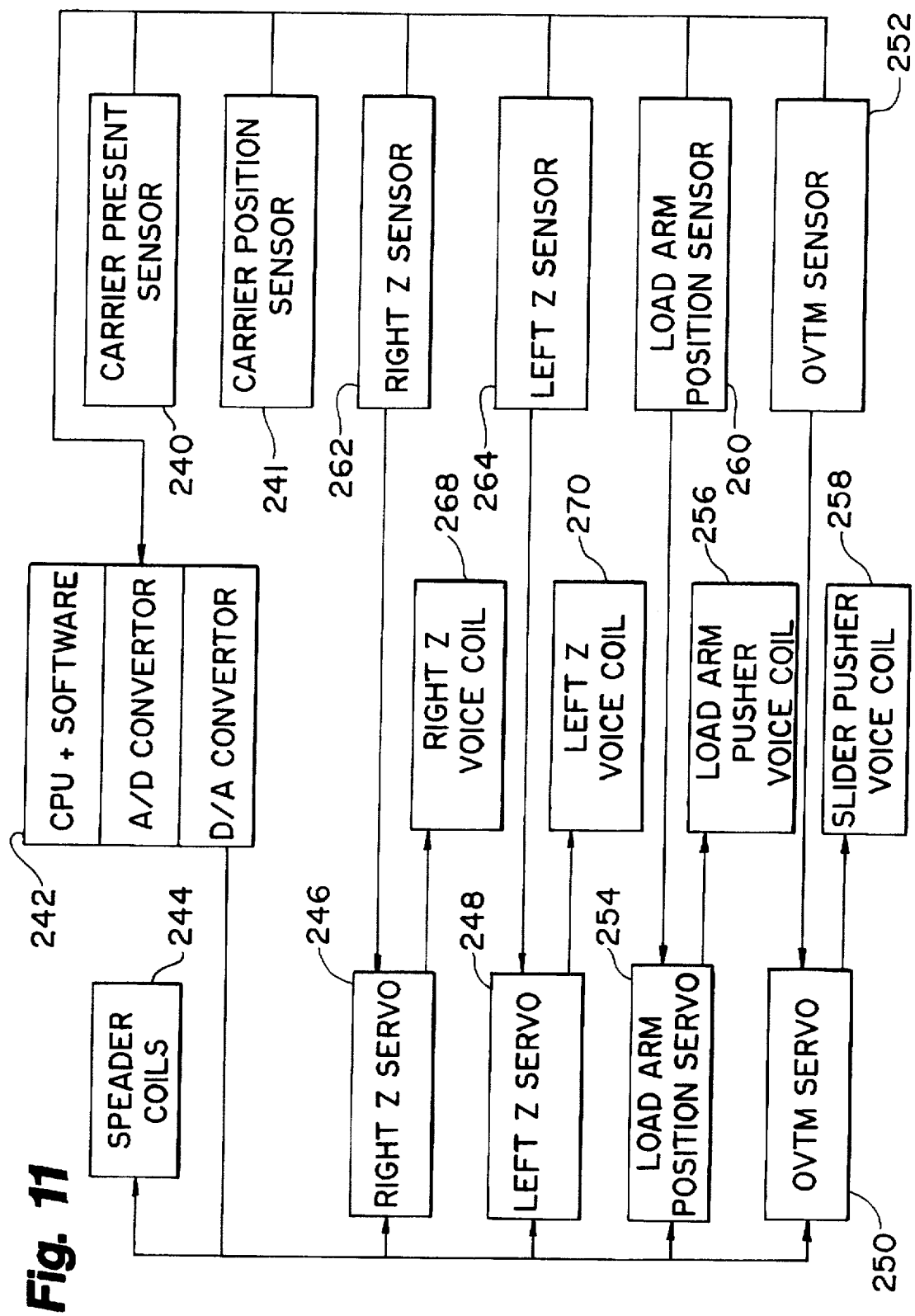
FIG. 11 is an operational control flow diagram of the processor that controls the measurement group of the LDA.

The total gram load and the differential gram load measurements are made of the normal force on air bearing surfaces 24, 26. Head 18 is held in a perfectly level condition by vertical flexures 152, 154. This is accomplished through use of a feedback system. Parallelogram flexures 158, 160 detect when the forces on air bearing surfaces 24, 26 move flexures 152, 154 out of the level position as indicated at 262 and 264 in FIG. 11. Motion of flexures 152, 154 distorts parallelogram flexures 158, 160. This distortion is detected by ferrite chips 160 and cup core 168 as the air gap therebetween changes. The coil impedance of cup core 168 is a function of the air gap between cup core 168 and winding 170. The air gap changes as parallelogram flexures 158, 160 are distorted as a function of the motion of vertical flexures 152, 154 respectively. Upon sensing motion in vertical flexures 152, 154, current in coils 140, 142 is altered to bring vertical flexures 152, 154 back to the position in which head 18 is absolutely level as indicated at 268, 270 in FIG. 11. The basic force equation is F equals K$\beta$li. Beta equals the air gap flux density, 1 equals the active wire length, i is the coil current and K is a numerical constant that provides for the correct system of units. Force, which is the differential gram loading, is a function of the current required to hold the head 18 level. Once vertical flexures 152, 154 are in the position in which head 18 is held absolutely level, the current in coils 140, 142 is directly related to the force required to hold head 18 in the level position.

When the normal force of measurements have been made, the sum of the normal force on vertical flexures 152, 154 compares the total gram load on head 18 and the differential between the two normal force measurements measured by vertical flexures 152, 154 provides the differential gram load. The measured total gram load and differential gram load is compared by the computer to the target total gram load and differential gram load that is desired for the specific HGA 12 that is being actuated. Such comparison may indicate that no bending and twisting of the load arm 14 of HGA 12 is required. Usually, however, some bending and/or twisting is required. Utilization of the above comparison in conjunction with a stored table of bending and twisting data results in the calculated amount of twist and direction of twist and calculated amount of bend and direction of bend that should be applied to HGA 12 in order to achieve the target total gram loading and differential gram loading.

Alternatively, load arm 14 measurements may be made prior to bonding of the head 18 to the gimbal 16. This is accomplished by utilizing a dummy head 18. The dummy head 18 is retained in the grip of the vertical flexures 152, 154. The load arm 14 and the gimbal 16 are lifted off the dummy head 18 as will be presently described. The load arm 14 is then bent and/or twisted responsive to the measured total gram loading and differential gram loading. The load arm 14 and the gimbal 16 are then returned to the position in contact with the dummy head 18 for subsequent measurements to determine if the bending and/twisting was adequate. In order to ensure the relation of subsequent measurements to prior measurements, the gimbal 16 must rest on the same point of the dummy head 18 to a high degree of accuracy for each measurement.

In order to apply the calculated twisting and bending corrections to HGA 12, positioner arm 370 is moved from the measurement position to the actuation position by actuation of motor 362. The carriage positioner 354 is energized to move carriage 352 to the left. As carriage 352 moves to the left, the HGA angular actuator 360 slides over and encompasses HGA 12. The twisting and bending motions may be done sequentially or they may be accomplished in one single motion in which HGA angular actuator 360 moves in both twisting and bending directions simultaneously. With respect to bending motion, it has been determined that it is always best to finish a bending sequence with a downward bending motion. Accordingly, if the total gram loading on HGA 12 as measured is too great, an excessive upward bend is applied to HGA 12 to reduce the total gram loading below the target position and then a slight downward bend is applied to bring HGA 12 back to the desired total gram loading.

At the completion of the twisting and bending sequence, carriage 352 is again moved to the right, withdrawing HGA angular actuator 360 from its embrace of HGA 12. Positioner arm 370 is then lowered from the actuation position to the measurement position and the measurement sequence as previously described will again be performed. If the bending and twisting sequence did not apply enough correction to HGA 12 to bring it within the target total gram loading and differential gram loading values, a successive twisting and bending sequence will be commanded. This iterative bending and twisting process will continue through a selected number of sequences at the end of which, if the HGA 12 is not within the target total load and differential gram load parameters, the specific HGA 12 will be rejected as a bad part.

Although a certain specific embodiment of the present invention has been shown and described, it is obvious that many modifications and variations thereof are possible in light of the teachings. It is to be understood therefore that within the scope of the appended claims, the invention may be practiced otherwise than as specifically described herein.

What is claimed is:

1. A device designed to shape a load arm of a head gimbal assembly, the load arm having a gimbal mounted thereon, the gimbal supporting a head operably coupled thereto, the head having at least two spaced apart air bearing surfaces, the shaping of the load arm being adapted to achieve the desired total gram loading and differential gram loading on the head needed to cause a selected one of the at least two air bearing surfaces of the head to fly at a desired fly height above a rotating magnetically coated disc and the head to fly at a desired flight attitude with respect to the rotating magnetically coated disc, comprising:

load distribution measurement and adjustment means, having;

a. gram load measurement means being operably coupled to a selected two of the at least two air bearing surfaces of the head for measuring the total gram loading on the head and the differential gram loading on each of the selected two air bearing surfaces of the head;

b. processor means communicatively coupled to the gram load measurement means for comparing the measured total and differential gram loading measurements made by the gram load measurement means to known total and differential gram loadings of the head, the known total and differential gram loadings of the head being related to a desired fly height of a selected air bearing surface of the head above the rotating magnetically coated disc and to a desired flight attitude of the head; and c. angular actuation means operably coupled to the processor means for applying a twisting force and bending force to the load arm responsive to commands generated by the processor means, such commands being related to the comparison of the measured total and differential gram loading measurements made by the gram load measurement means to the known total and differential gram loadings of the head.

2. A device as claimed in claim 1 wherein the gram load measurement means includes:

an overturning moment sensor adapted to sense the presence of an overturning moment on the head of the head gimbal assembly; and a translating base communicatively coupled to the overturning moment sensor and being adapted to engage the head gimbal assembly and to translate in the plane of the overturning moment, such translations being responsive to the sensing of an overturning moment to null out such moment.

3. A device as claimed in claim 2 wherein the gram load measurement means further includes a first support means for engaging and supporting a first portion of the head of the head gimbal assembly and a second space apart and substantially parallel support means for engaging and supporting a second portion of the head of the head gimbal assembly, the overturning moment sensor detecting the engagement of the first support means with the first portion of the head of the head gimbal assembly and detecting the engagement of the second support means with the second portion of the head of the head gimbal assembly.

4. A device adapted to shape the load arm of a head gimbal assembly to achieve a desired fly height and flight attitude of a head mounted on the load arm with respect to a rotating magnetic disc, the head having at least two spaced apart air bearing surfaces, the load distribution and adjustment device comprising:

load distribution measurement and adjustment means, having:
a processor;
sensor means for sensing the total gram loading on the head of the head gimbal assembly and the differential gram loading on a selected two of the at least two spaced apart air bearing surfaces of the head, being communicatively coupled to said processor, providing communications representative of the total and differential gram loads on the head gimbal assembly parameters to said processor; and
angular actuator means for shaping the load arm of the head gimbal assembly as desired, having two degrees of freedom and being communicatively coupled to said processor and receiving actuation commands therefrom,
said actuation commands commanding the angular actuator means to engage the load arm of the head gimbal assembly and to shape the load arm by bending thereof in said two degrees of freedom,
whereby the actuation commands are related to a predicted fly height determined by the processor by comparing the sensed total gram loading on the head of the head gimbal assembly and the sensed differential gram loading on a selected two of the at least two spaced apart air bearing surfaces of the head to a known total gram loading on the head of the head gimbal assembly and a known differential gram loading on the selected two of the at least two spaced apart air bearing surfaces of the head.

5. A device as claimed in claim 4 further including a head gimbal assembly mounting means being communicatively coupled to the processor for selectively positioning the head gimbal assembly between a head gimbal assembly gram load measurement position and a head gimbal assembly shaping position.

6. A device as claimed in claim 4 wherein the differential gram load measurement means includes:

an overturning moment sensor adapted to sense the presence of an overturning moment on the head of the head gimbal assembly; and
a translating base communicatively coupled to the overturning moment sensor and being adapted to engage the head gimbal assembly and to translate in the plane of the overturning moment,
whereby such translations are responsive to the sensing of an overturning moment on the head of the head gimbal assembly, the translations nulling out such moment.

7. A device as claimed in claim 6 wherein the gram load measurement means further includes a first support means for engaging and supporting a first portion of the head of the head gimbal assembly and a second support means for engaging and supporting a second portion of the head of the head gimbal assembly, the overturning moment sensor detecting the engagement of the first support means with the first portion of the head of the head gimbal assembly and detecting the engagement of the second support means with the second portion of the head of the head gimbal assembly.

8. A device as claimed in claim 7 wherein the first and second support means comprise respective first and second flexures.

9. A device as claimed in claim 7 wherein the angular actuation means is comprised of a set of jaws having a slot defined therebetween, the slot having sufficient width to embrace the load arm and to remain spaced apart therefrom.

10. A device as claimed in claim 9, the load arm of the head gimbal assembly having a longitudinal dimension defined between first and second ends thereof and a lateral dimension defined transverse thereto and having a bend radius defined along the longitudinal dimension, wherein the angular actuation means defines an arcuate path of actuation, imposing a desired longitudinal bend to the load arm at a desired longitudinal dimension on the load arm, one such dimension being coincident with at the bend radius thereof.

11. A device as claimed in claim 10 wherein the angular actuation means defines a rotational path of actuation about the longitudinal dimension of the load arm, imposing a desired lateral twist to the load arm.

12. Apparatus for measuring the gram loading on a transducer head of a head gimbal assembly, the transducer head being subject to a normal force and having at least first and second air bearing surfaces, comprising:

load distribution measurement and adjustment means, having:
a first force balance means for sensing a displacement of the first air bearing surface from a predetermined position as a result of the normal force and generating a countering force necessary to reposition the first air bearing surface to the predetermined position; and
a second force balance means for sensing a displacement of the second air bearing surface from a predetermined position as a result of the normal force and generating a countering force necessary to reposition the second air bearing surface to the predetermined position.

13. A method of measuring the total and differential gram loading of a transducer head with respect to a supporting arm, the transducer head being subject to a normal force and having first and second air bearing surfaces, comprising the steps of:

sensing a displacement of the first air bearing surface from a predetermined position as a result of the normal force;
generating a first countering force necessary to reposition the first air bearing surface to the predetermined position;
sensing a displacement of the second air bearing surface from a predetermined position as a result of the normal force;
generating a second countering force necessary to reposition the second air bearing surface to the predetermined position; and
determining the load distribution on the transducer head by summing the first and the second countering forces to determine the total gram loading on the transducer head and comparing the first and the second countering forces to determine the differential gram loading on the transducer head.

14. A head gimbal measurer for measuring the force loading on a head, the head having a plurality of air bearing surfaces, to predict the flight height of a selected one of the plurality of air bearing surfaces when the head is in operation relative to a rotating magnetically coated disc, the head gimbal measurer comprising:

measurement means for measuring the total normal force on the head and the differential normal force on each of a selected two of the plurality of air bearing surfaces; and processing means for comparing the measured total normal force on the head and the differential normal force on each of the selected two of the plurality of air bearing surface with a known total normal force on the head and a known differential normal force on each of the selected two of the plurality of air bearing surfaces to predict a flight height of the head when in operation relative to the rotating magnetically coated disc.

15. The head gimbal measurer as claimed in claim 14 further including second measurement means for measuring an overturning moment force acting on the head.

16. The head gimbal measurer as claimed in claim 14 wherein the measurement means are linear variable differential transformer type positioning transducers.

17. A head gimbal measurer for measuring the force loading on a head of a head gimbal assembly, the head of the head gimbal assembly being designed to operate at a desired fly height relative to a rotating magnetically coated disc comprising:

measurement means for measuring a load distribution on the head; and processing means for comparing the measured load distribution on the head with a known load distribution on the head to predict a fly height of the head when in operation relative to the rotating magnetically coated disc.

18. The head gimbal measurer as claimed in claim 17 further including second measurement means for measuring an overturning moment force acting on the head.

19. The head gimbal measurer as claimed in claim 17 wherein the measurement means are a plurality of linear variable differential transformer type positioning transducers.

* * * * *